United States Patent [19]

Burnham et al.

[11] Patent Number: 5,058,113
[45] Date of Patent: Oct. 15, 1991

[54] METHOD AND APPARATUS FOR CORRECTING ERRORS IN A SYSTEM

[75] Inventors: Dana Burnham, Reston; Lewis Ray, Midland, both of Va.

[73] Assignee: Sprint International Communications Corporation, Reston, Va.

[21] Appl. No.: 285,441

[22] Filed: Dec. 16, 1988

[51] Int. Cl.⁵ .............................................. G06F 11/00
[52] U.S. Cl. .................................. 371/15.1; 364/200; 364/276
[58] Field of Search ..................... 371/15.1, 16.4, 16.5; 364/513, 550, 200 MS File, 900 MS File, 276.5, 276.8, 276

[56] References Cited

U.S. PATENT DOCUMENTS

| | | | |
|---|---|---|---|
| 4,586,147 | 4/1986 | Tadokoro | 364/550 |
| 4,617,661 | 10/1986 | Futaki et al. | 371/16.4 |
| 4,642,782 | 2/1987 | Kemper et al. | 364/550 |
| 4,841,456 | 6/1989 | Hogan, Jr. et al. | 364/550 |

*Primary Examiner*—Charles E. Atkinson
*Attorney, Agent, or Firm*—Kenyon & Kenyon

[57] ABSTRACT

The disclosure relates to a computer based method for artificial intelligence with sufficient flexibility for permitting the program to be configured or adapted to different circumstances. The computer based method is provided with a simplified language which permits certain tasks to be done in a preselected sequence as determined by the user. All the tasks and the time at which they will be accomplished are set out in a job display indicating the day, the start time, the end time, the length of interval and when the next one will be accomplished. Errors, when found, are flagged and error correction strings are utilized to automatically correct the error so that the computer can move to the next job. Recordation of the job monitored and any errors found can be made in any convenient data base, including a printer, a voice signal or simply the display. This system permits the more mundane monitoring tasks to be accomplished by computer based method alerting the personnel only when needed.

15 Claims, 1 Drawing Sheet

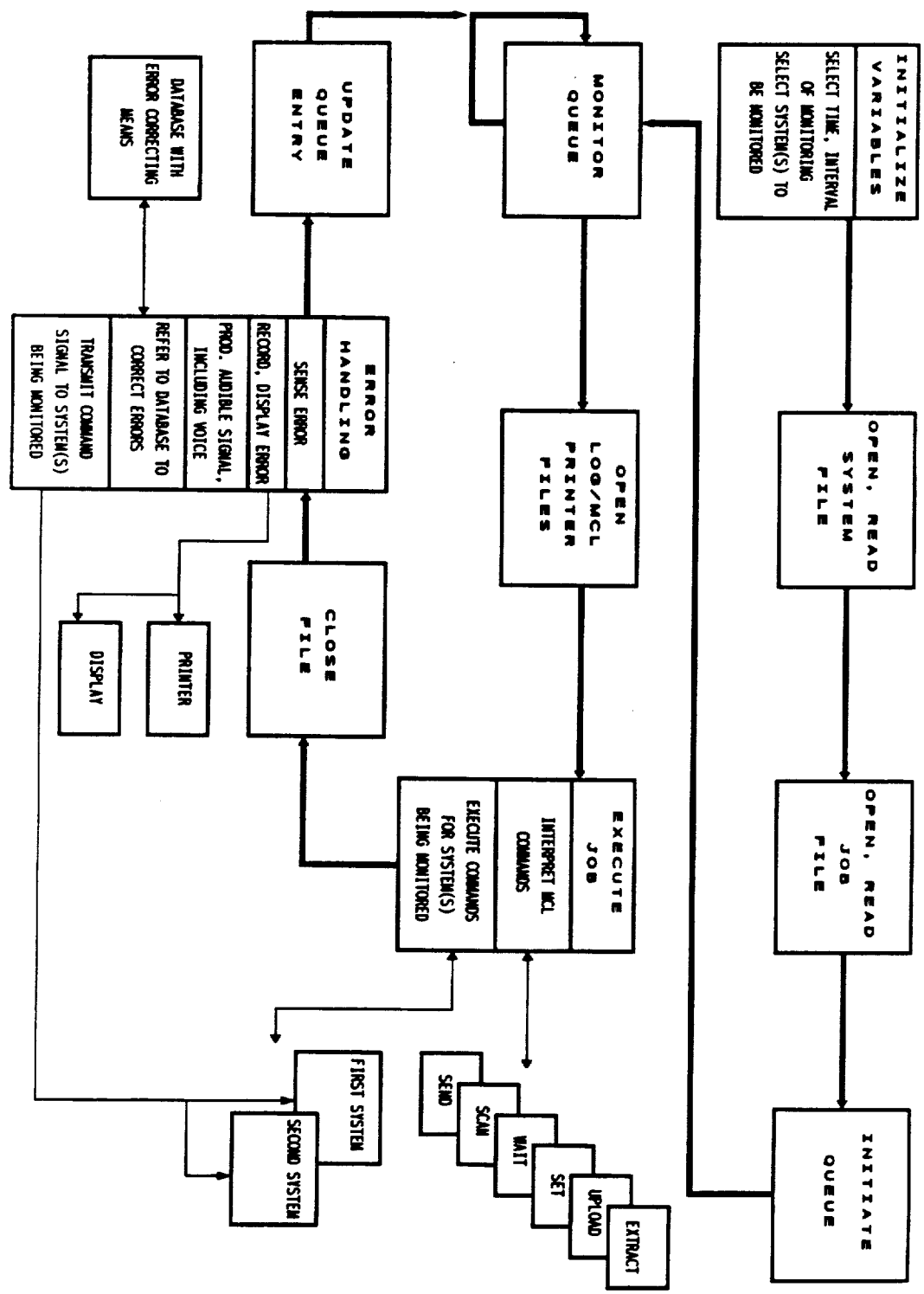

METHOD AND APPARATUS FOR CORRECTING ERRORS IN A SYSTEM

In computer based methods, there have existed specific applications for what is commonly referred as artificial intelligence where corrective measures for errors or specific operations are already programed into the computer method. These programs have specific applications such as guiding a missile to its target or actuating a robot arm for a specific task. Such use of artificial intelligence has critical limitations that prevent its wide acceptance for a multitude of uses in a commercial market place. Because the programs are often limited to a particular task, conversion to other tasks is limited, if not prohibited entirely.

Even in specific applications flexibility may be limited as a particular operation cannot be adapted to different circumstances. Error corrections in response to various response signals cannot be programmed or revised to accommodate new errors or their solutions. A variety of warning or other signals to which the user can respond are not available. Most importantly, a series of disparate tasks cannot be programmed at different intervals with each having its own set of variables and error corrections. Without such flexibility substantial burdens are placed on widespread use of artificial intelligence computer based methods.

The invention described herein has overcome the problems noted above in an operational program utilizing a broad based computer operation which can be used with personal computers and configured for the particular environment for a large number of tasks. In addition, there are a number of reporting modes which can be utilized such as voice, printer, screen or mail. This provides the user with various warning systems and recording systems both to warn and record the error message and, if programed, the corrections. The features of the program provide flexibility, enhance productivity, provide a cost efficient and easy to use method of correcting errors, and ensure the proper operation of various systems with which the computer base method is used.

The flexibility results in part from the ability of the software to be configured for any particular environment. Whether it is simply tracking data or operating machinery, the system can be configured for operation in the users particular environment. In addition, there is provided a default initialization string such that the initial variables are defaulted in particular setting unless programmed differently by the user.

This program permits formatting of an error message for posting or listing to the user system. More detailed data can be obtained upon finding a particular error signal through a query function for real time data input. Other accessories or warning systems such as "DEC-TALK" support and printer support are optional and can be selected by the user depending on the needs.

This permits any error recovery in reporting to be defined by the user based on the severity of the error. That is some errors may require printer support or "DECTALK" support while other errors need only be recorded and reported on the display. The jobs or tasks are capable of running daily, weekly, on a specific day or at any time as requested by the user. This provides substantial flexibility and a broad use of artificial intelligence system particularly for those tasks that require monitoring of relatively mundane tasks often subject to human error.

Such a system enhances productivity in a wide range of uses. Because of the mundane tasks and other monitoring tasks that can be performed by this computer based system, there is eliminated a need of personnel to conduct these routine tasks. In addition, there is standardized complicated tasks that minimizes human error. These repeated tasks can be done easily by inputting variables for separate files corresponding to the tasks. The information can be collated and synthesized as needed to evaluate the operation of a particular system.

There is a cost effectiveness associated with the system because of its ability to report during off hours and when unattended, particular systems, while providing the ability to recover any error, a message and its correction. Time that is normally wasted in looking at a noncritical error can be eliminated through the artificial intelligent systems which corrects these errors automatically. Only critical errors need to be viewed by the user. There is provided an effective use of resources, since technicians need only respond when a significant error is noted.

As will be discussed in the preferred embodiment below, in designing a particular configuration, the job to be run along with other variables are designated by a default mode if not otherwise identified. A name will be given to a particular routine code when created and the name of the file in which the data is to be logged. The start time and stop time are selected using military format, and each job will be run in intervals given in minutes which a default is 60 minutes. Similarly, if a particular day is required for a particular job, this data can also be inputted, otherwise it is defaulted into every single day. Where a number of tasks are involved, they are arranged in a queue with each queue entry being updated with the next run time, based on the interval specified. If there is an error noted, an error flag is shown on the display. Control is passed back to the monitoring queue function where it will continue until manually aborted.

The above has been a brief description of certain deficiencies in the prior art and advantages of the invention described herein. Other advantages will be perceived from the detailed description of the preferred embodiment which follows:

BRIEF DESCRIPTION OF THE DRAWINGS

FIG. 1 shows a flow chart of the inventive computer operated system.

DETAILED DESCRIPTION OF THE PREFERRED EMBODIMENT

As can be seen from FIG. 1, the basic operational program has program variables and arrays initialized to default settings unless otherwise changed by the user. For example, the identification to reflect the name of the system or a job to be run is created by the user, but the particular port is defaulted to a particular communications path. The command language (MCL code) is created by the user certain routines within a given job. A file the data is to be logged can be created, otherwise it is defaulted into a particular file. The time variables are preset unless specific time intervals are imposed by the user. With these default settings and variables, artificial intelligence operation for many applications can be achieved with little supervision of the user.

After these initial variables are set, the system file is created to ensure that the program will run properly. This file is used for setting global values and other general parameters such as modem speed, color and the introduction message. The job file is then processed to create the queue which lists the parameters such as day, start time, end time and interval for each job. Subsequent run times are calculated in the queue displayed on the screen. The system constantly monitors the status of each job and the time in which it is to be run. When the job is ready, the job number is passed to the subroutine to perform the particular task for that job in the queue. In executing that job all the files required for the execution are then opened or otherwise created.

The above has been a brief description and summary of the operation of the system. The following is a more detailed operation as an example of how the computer based system can be utilized by an operator.

A file containing a list of jobs is created for the system. The file is initially identified by a name which reflects the name of the particular system to be run. For example, if you are reviewing mail or some other lengthy set of data, that can be defined simply as "MAIL" or "XYZ" data base. If the information will be delivered through a particular port, that port can also be identified. Otherwise as explained it will be defaulted to a particular port. A particular routine to be executed using the command language of the program (MCL code) is also created. For this example that code could be nominated "MAIL" as well. The LOG is denominated the name of the file in which the data is to be logged. Although this has a default entry, it could also be denominated "Mail Log". The program also has starting, stop and interval times. In this instance, a start time of 07:30 could be imposed with a stop time of 23:30 p.m. at an interval of 15 minutes. Otherwise, it would be defaulted at zero and 23:59 as discussed above with the intervals being in about an hour. Similarly, since we are monitoring the mail on a daily basis, no entry would need be made for the day entry. However, if it is limited to a weekday when mail normally runs, each day could be inputted into the system. This program also has a banner name which is printed at the start of every job. In this case the job name is "Mail Upload from MOSE".

The example would be displayed as follows:

ID=MAIL  PORT=COMM2  MCL=MAIL  LOG=MAIL.LOG
START=07:30   STOP=23:30      INTERVAL=15
DAY=X  NAME=:MAIL UPLOAD FROM MOSE:

To set up the system file with global programs there are a number of variables which can be controlled. These include the location of certain messages that will appear on the screen, the modem speed, the time to wait for a signal, the number of times to dial a signal, the number of times in opening the communications port, various positions on the queue screen where certain information is to appear, the color of the foreground and background on the queue string, the speed with which a string will be initialized, and character used when the screen or buffer dumps are used, the character used to identify comments, the character denoting the digits which should be converted to ASCII equivalent. Other global parameters include the character that represent carriage return, switch for voice or to communications port, instructions for operating the log-in of all jobs to be executed and the use of a buffer when an internal memory is saturated.

Once parameters are defined, the system file is complete and the program will execute upon reading the system file. After that file is opened and read, a particular job file will be executed. Where a number of jobs are arranged on the queue, they will be listed in order. For example, if the first job is monitoring the mail, that will be listed on the first row with the day, starting time, ending time, interval and also showing when the next job will be undertaken. Another data monitoring step is involved such as monitoring certain information that could be listed as "TM data" in line 2 on the days and the times selected. The queue display includes a bottom line to show the current date and time as well as the name of the system file currently being used.

The CONTROL commands control the log-in, printing, display, filing and buffer clean-up. These are the MCL commands interpreted by the system upon opening the log/MCL printer files. Control commands include switching the disk, printer or screen to an "on" or "off" position, displaying certain characters in a readable form, clearing the buffer from the last job until the next job, clear the buffer completely, killing a specified portions of a file or deleting the file in its entirety, inserting a specified string at the beginning of every received line or appending a string to the end of every received line and closing a current log file or opening a specified one.

The CONNECT command makes a connection of the system to a specified service. The word here "TO" specifies a service address. The system will wait until the strings specified in the "RCV" field are received before executing the next command. The connection will be tried as many times as specified in the "TRIES" key word. If the string is not received, the system will try to connect to an alternate address specified by "ALT". If it is still unable to connect the system will time out and log the error.

To check the command used to determine if a specified file exists or is empty, the result is either TRUE or FALSE. If it does not exist, this will be printed or indicated on the screen as desired. A data command opens a file named by the key word "FILE" with access through a specific symbol; in this case an asterisk will send the string. The EXTRACT command takes the lines of data from the internal buffer that contain the specified strings and sends them to the printer, screen or disk. For example, the system can search the buffer for every occurrence of the string having the specific name. The filter command replaces a specified string with the incoming data and replaces it with a new string. The command can be switched with the "OPTION" key word. Of course, the "GO TO" command moves execution to the specified line. The "HALT" command stops execution of the system during error situations. The job menus will flash indicating where the error occurred. All files are closed during this procedure. The "IF" command checks the relationship between two strings. The key words associated with the "IF" command are those you would expect—if it is greater than a number, will execute one command, if it is less than a certain number, it will execute another.

The "EOF" command goes to the line specified at the end of the file created by the data command is reached. The initial port command opens the communication port and sets up for a specified baud rate. The system file as explained above contains the preset initialization strings for each band rate. If another initialization string is required, the option key word can be used to set it.

The log command logs messages to the printer, disk, display or all of them with optional time stamp and header. The mail command generates a telemail message and puts it in the mail queue. The message is posted when the system runs out the mail upload job. The print command prints the string to the screen, printer or disk, depending on the optional key word. HURRY command is used with an MCL file when information needs be prompted. The QUERY window appears on the screen and the position defined by the POS key word where the data will be entered and stored in a global variable. The WAIT key word is used to set the amount of time data can be entered before the system moves on and assigns it default value.

The STOP command stops execution of this system during normal conditions. All files are closed during this procedure. The SEND command sends the specific specified characters to the communications line. The SET command assigns a variable to a specified string and alters it as specified. The SPEAK command speaks the specified string into the voice designated by the voice key word. The voice options are MESSAGE, ERROR, INFORMATION and WARNING. The SCAN command searches the internal buffer for occurrence of the string in a specified relationship. For example, when the buffer is searched for a specific relationship of words, if they are found, then the execution will jump to a different line.

"TIME OUT" is a command used to set the length of the time out. The system will wait for a number of seconds as specified before timing out. The UPLOAD COMMAND uploads a specified file to the communications port while monitoring for flow control. The WAIT command checks the modem until a string is found. If the string is not found, the program times-out and prints the appropriate error message. If the ERR-TALK is on, the error is sent to DEC-TALK and is spoken on the error voice. ERR-RESUME tells the system what line to go to in the MCL after error has occurred. If the ERR-RESUME is omitted, then the error will be posted and the job halted.

Using the above system the following is an example of program operation for various tasks such as (1) checking the mail; (2) searching a database for certain trademarks; and (3) checking for security breaches. The following information must be input into the computer.

| ID | MAIL | TM SEARCH | SECURE |
|---|---|---|---|
| POR | MAILCOMM2 | COMM2 TM | COMM1 |
| MCL | MAIL | TM | SECURITY MX |
| DAY | X | F | X |
| STRT | 0:15 | 9:00 | 0:15 |
| END | 23:45 | 12:00 | 23:59 |
| INT | 15 | 60 | 60 |
| LOG | MAIL | TM SEARCH | SECURITY CHECK |
| NAME | MAIL UPLOAD FROM MOSE | TRADEMARK UPLOAD FROM MOSE | SECURITY UPLOAD FROM MOSE |

After the initial variables are set as discussed above, the information for each job is inputted as noted. Each job is arranged in a queue according to the sequence selected by the user and can be displayed in the following manner:

| JOB NAME | DAY | STRT | END | INT. | NXT |
|---|---|---|---|---|---|
| 1 MAIL | X | 0:15 | 23:45 | 15 | 5:30 |
| 2 TM DATA | F | 9:00 | 12:00 | 60 | 9:00 |
| 3 SECURITY MX | X 0:15 | 23:59 | 240 | 60 | 6:00 |

With this display the user can readily determine all jobs that are being monitored under the computer method when the next job will be completed, and other information which is pertinent for each particular job.

In the MAIL task the data is fed directly into the computer from another source through PORTCOM 2. For the MAIL jobs the system is programmed to scan the information received and extract the mail information desired and have it sent to a printer, screen or disk. The string "MAIL UPLOAD FROM MOSE" will mark the job on the printer and a file MAIL.LOG will contain data that is logged during execution. The job will not be run again until after 5:30 p.m.

TM DATA is programmed to search for certain trademarks contained in a database that become available Friday morning each week. Through the port as selected, after the source has been connected via a modem, the data received is scanned until the selected trademarks are found. The requisite information such as particular trademarks, the owner, the date of registration, etc. is extracted and sent to the printer, screen or disk. The string "TRADEMARK SEARCH FROM MOSE" will designate the job on the printer and a file TM SEARCH will contain data logged during execution. The job will not be run after 12:00 noon on Friday and will not be started again until 9:00 a.m. the following Friday. To obtain access to the TM DATABASE the appropriate access code is programmed so that it can be dialed through a modem automatically.

Finally, a security system can be monitored to ensure that it is operational. Such a security system itself may monitor various modes of access to the buildings, rooms, drawers, cabinets, etc. by constantly measuring signals corresponding to a locked or unlocked disposition. Based on the data noted above, the security system is monitored via port 1. The information is scanned to ensure the system is operational and this information is sent to a printer, screen or disk. The string SECURITY CHECK will make the job on the printer and a file SECURITY MX will contain the data that is logged during execution. The job will not be run again until 6:00 a.m.

All of the systems can contain error routines where certain corrective measures are made automatically for any errors found when a particular job is executed. The error routine creates a mail queue entry with a screen dump and status of a particular job with a flag that the job did not complete successfully. The same can be done for the TM SEARCH and the SECURITY CHECK. In this manner the user will be informed immediately if he is using the screen or printer that an error has occurred.

Where an error has been found and the corrective action has been programmed into the error handler, the corrective action will automatically take place. In the case of the security system for example, where monitoring system for security is down because of the source switch not being properly activated, the system can be programmed to activate that switch. Once the switch is activated the job will be reexecuted until a success mode is completed. If a success mode is not reactivated, for example where the source is inactive, another switch can be activate which connects the system to a different active source. Again the program will be reexecuted to determine whether the system is activated. Once it is activated and success is obtained, this will be indicated on the system and the file will be closed. This string can be connected to the printer as well as the screen or any other display to indicate that the corrective action has been completed successfully. In addition to using the screen or the printer where such an error has occurred, it can be connected to DEC-TALK where the appropriate sound will be produced as a warning to indicate that the system is down.

What is claimed is:

1. A computer based method, comprising the steps of:
   (a) selecting a first system to be monitored using a computer method, said first system having a number of specific variables having preselected values corresponding to said first system;
   (b) selecting, using computer methods, the time at which the monitoring of the selected system will be commenced;
   (c) selecting discrete intervals during the monitoring of the system at which the selected system will be monitored;
   (d) recording said system selected, said time and said interval;
   (e) recording and visually displaying warnings of errors when said variables are other than the preselected values.

2. The computer based method according to claim 1 further comprising the step of correcting errors in the system being monitored by referring to a database with means for correcting errors in said system being monitored, said means for correcting errors being activated when corresponding errors are found during execution of a particular job.

3. The computer based method according to claim 2 including the step of monitoring the system at a location remote from a monitoring computer by means provided for monitoring said remote system, further including the step of correcting errors by transmitting from said database command signals corresponding to error correction to said remote system.

4. The computer based method according to claim 3 including the step of providing as said remote system a second computer system, said error including said second computer system being deactivated, said means for correcting said second computer system including activating said system by connecting it to a power source, transmitting said signal to said second system upon detection of said error.

5. The computer based method according to claim 4 wherein said corrective step includes producing an audible signal as a warning.

6. The computer based method according to claim 5 wherein said audible signal as a warning includes a simulated human voice.

7. The computer based method according to claim 6 wherein said method for recording information includes transmitting information to a printer.

8. The computer based method comprising the steps of:
   (a) selecting a first system to be monitored using a computer method, said first system including first preselected variables;
   (b) selecting a second system to be monitored using a computer method said second system having a second set of preselected variables;
   (c) selecting a first interval during which said first system will be monitored, said intervals being at different times;
   (d) recording said selected variables, said interval time and said intervals;
   (e) monitoring said first system during said first preselected intervals and recording the results of said first system monitoring step;
   (f) monitoring said second system during said second interval and recording the results of said second system monitoring step.

9. The computer based method according to claim 8 wherein said recording step includes recording the proper operation and any errors in said monitoring steps during said intervals.

10. The computer based method according to claim 9 wherein said recording step includes displaying information on the screen.

11. The computer based method according to claim 9 wherein said recording step includes converting information obtained to an audible signal 12. The computer based method according to claim 9 wherein said recording step includes recording said information on a data base.

13. The computer based method according to claim 9 wherein said recording step includes recording information on a printer.

14. The computer based method according to claim 13 including an error correction step of sensing an error in at least one of said first and second systems, addressing a data base for correcting said error, correcting the error based on instruction of said data base and continuing said monitoring step.

15. The computer based method according to claim 14 wherein said recording step includes recording the presence of an error and said error correction.

* * * * *